(12) United States Patent
Fanghaenel et al.

(10) Patent No.: US 11,151,110 B2
(45) Date of Patent: Oct. 19, 2021

(54) IDENTIFICATION OF RECORDS FOR POST-CLONING TENANT IDENTIFIER TRANSLATION

(71) Applicant: salesforce.com, inc., San Francisco, CA (US)

(72) Inventors: Thomas Fanghaenel, Oakland, CA (US); Stephane Geneix, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 145 days.

(21) Appl. No.: 16/139,594

(22) Filed: Sep. 24, 2018

(65) Prior Publication Data
US 2020/0097573 A1   Mar. 26, 2020

(51) Int. Cl.
G06F 16/22 (2019.01)
G06F 16/27 (2019.01)
G06F 16/23 (2019.01)
G06F 16/2452 (2019.01)

(52) U.S. Cl.
CPC ........ *G06F 16/2272* (2019.01); *G06F 16/221* (2019.01); *G06F 16/23* (2019.01); *G06F 16/2452* (2019.01); *G06F 16/27* (2019.01)

(58) Field of Classification Search
None
See application file for complete search history.

(56) References Cited

U.S. PATENT DOCUMENTS

| | | |
|---|---|---|
| 2002/0111820 A1 | 8/2002 | Massey |
| 2005/0223022 A1* | 10/2005 | Weissman ...... G06Q 10/063112 |
| 2008/0162491 A1* | 7/2008 | Becker ................. G06F 16/275 |
| 2013/0018890 A1 | 1/2013 | Rajan |
| 2018/0307857 A1* | 10/2018 | Beecham ............ G06F 16/9024 |

FOREIGN PATENT DOCUMENTS

WO   2018085641 A1   5/2018

OTHER PUBLICATIONS

International Search Report and Written Opinion for Application No. PCT/US2019/052453, dated Jan. 8, 2020, 12 pages.
International Preliminary Report on Patentability for App. No. PCT/US2019/052453, dated Apr. 1, 2021, 8 pages.

* cited by examiner

*Primary Examiner* — Giuseppi Giuliani
(74) *Attorney, Agent, or Firm* — Butzel Long; Ian Harrison; Cynthia Seve

(57) ABSTRACT

Systems, devices, and techniques are disclosed for identification of records for post-cloning tenant identifier translation. Records may be received from a database system executing a database executor at a computing device executing a database application. The database application may identify, from among the records, records that include a record header that includes a bit indicating that an encoded value of a tenant identifier is stored in the record in a column of the record that is not a tenant identifier column. The database application may generate an index based on the records identified by the database application. The database application may access the records using the index and replace the encoded value of the tenant identifier stored in columns of the records with an encoded new value of a tenant identifier.

21 Claims, 15 Drawing Sheets

960

| | Key Column 1001 | Tenant Identifier Column 231 | Data Column 232 | Data Column 233 | Data Column 234 | Data Column 235 | Record Type Indicator Column 1005 |
|---|---|---|---|---|---|---|---|
| 400 | Key 410 | Encoded New Tenant Identifier 441 | Column Value 242 | Encoded Tenant Identifier 241 | Encoded Tenant Identifier 241 | Column Value 245 | 1 |
| 1010 | Key 1011 | Encoded New Tenant Identifier 441 | Column Value 1012 | Column Value 1013 | Column Value 1014 | Column Value 1015 | 0 |
| 1020 | Key 1021 | Encoded New Tenant Identifier 441 | Column Value 1022 | Column Value 1023 | Column Value 1024 | Column Value 1025 | 0 |
| 1030 | Key 1031 | Encoded New Tenant Identifier 441 | Encoded Tenant Identifier 241 | Column Value 1032 | Encoded Tenant Identifier 241 | Column Value 1035 | 1 |
| 1040 | Key 1041 | Encoded New Tenant Identifier 441 | Column Value 1042 | Encoded Tenant Identifier 241 | Column Value 1045 | Encoded Tenant Identifier 241 | 1 |

| Key Column 1001 | Tenant Identifier Column 231 | Data Column 232 | Data Column 233 | Data Column 234 | Data Column 235 | Record Type Indicator Column 1005 |
|---|---|---|---|---|---|---|
| Key 410 | Encoded New Tenant Identifier 441 | Column Value 242 | Encoded Tenant Identifier 241 | Encoded Tenant Identifier 241 | Column Value 245 | 1 |
| Key 1011 | Encoded New Tenant Identifier 441 | Column Value 1012 | Column Value 1013 | Column Value 1014 | Column Value 1015 | 0 |
| Key 1021 | Encoded New Tenant Identifier 441 | Column Value 1022 | Column Value 1023 | Column Value 1024 | Column Value 1025 | 0 |
| Key 1031 | Encoded New Tenant Identifier 441 | Encoded Tenant Identifier 241 | Column Value 1032 | Encoded Tenant Identifier 241 | Column Value 1035 | 1 |
| Key 1041 | Encoded New Tenant Identifier 441 | Column Value 1042 | Encoded Tenant Identifier 241 | Column Value 1045 | Encoded Tenant Identifier 241 | 1 |

Fig. 9

| Key Column 231 | Record Type Indicator Column 1005 |
|---|---|
| Key 410 | 1 |
| Key 1031 | 1 |
| Key 1041 | 1 |

IDENTIFICATION OF RECORDS FOR POST-CLONING TENANT IDENTIFIER TRANSLATION

BACKGROUND

Records in a multi-tenant database may include tenant identifiers that indicate the tenants that own the records. In some situations, records belonging to a tenant may need to have their included tenant identifier replaced with a new tenant identifier. Identifying records that may need to be translated may be computationally intensive.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 9 shows an example arrangement suitable for identification of records for post-cloning tenant identifier translation according to an implementation of the disclosed subject matter.

FIG. 10 shows an example arrangement suitable for identification of records for post-cloning tenant identifier translation according to an implementation of the disclosed subject matter.

DETAILED DESCRIPTION

Figure 1:
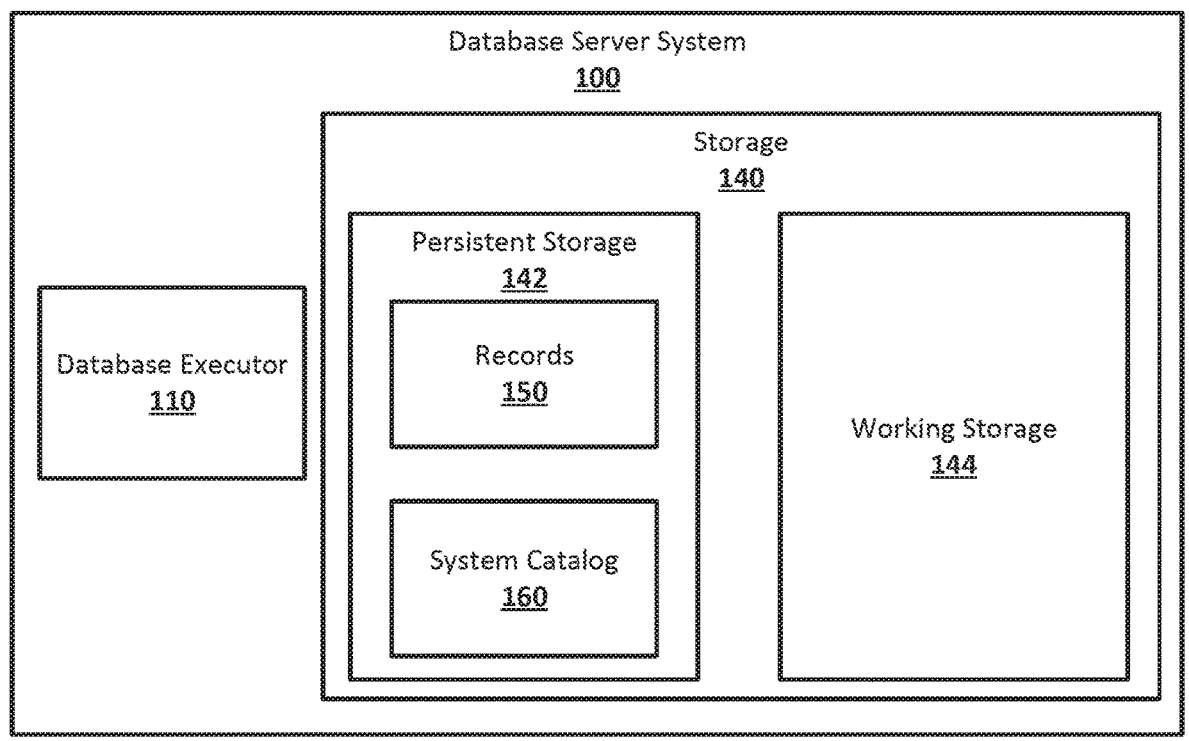
FIG. 1 shows an example system for identification of records for post-cloning tenant identifier translation according to an implementation of the disclosed subject matter.

Techniques disclosed herein enable identification of records for post-cloning tenant identifier translation, which may allow for more efficient identification of records for post-cloning tenant identifier translation and more efficient post-cloning tenant identifier translation. A record that includes a copy of a value of a tenant identifier for the record in columns of the record may have a record type bit set in its record header. The value of the bits in the record headers for records in a table may be exposed in a column added to the table. A partial index may be generated that may include records for which the record type bit in their record headers is set to 1, or true. The partial index may be used to identify and access records for post-cloning tenant identifier translation.

A tenant identifier may be used to identify the owner of records stored in a database system. The value of a tenant identifier assigned to a tenant may be used as part of the key for all of the records belonging to the tenant that may be stored in the database system. The value of a tenant identifier may be represented as, for example, an alphanumeric string.

If the database system is a multi-tenant database system, a unique tenant identifier may be assigned to each of its tenants. Multi-tenancy may allow various tenants, which may be, for example, users, groups of users, or organizations, to access their own records in the database system through software tools or instances on the database system that may be shared among the various tenants. The records for each tenant may be part of a database for that tenant. The database may be, for example, a relational database, hierarchical database, or any other suitable database type. All records stored in the database system may be stored in any suitable structure, including, for example, a Log-Structured Merge (LSM) tree.

A record stored in the database system may include a key. The key may be an identifier for the record, for example, a primary key, and may be in any suitable form, such as, for example, an alphanumeric sequence. Portions of the key may provide information about the record. For example, a portion of the key be the value of the tenant identifier for the tenant to whom the record belongs. Other portions of the key may identify, for example, a table number and identification of a row, for example, when the value of record is the contents of a row.

A record may include values. The values in a record may be, for example, the contents of columns in a row of a table of a relational database, stored as a tuple with one value per column. The values stored as a tuple may be encoded, for example, using a binary encoding. Some records may store the value of the tenant identifier for the tenant that owns the record encoded in the tuple as an encoded value of the tenant identifier. The encoded value of the tenant identifier may be stored in, for example, a tenant identifier column of the record. The encoded value of the tenant identifier may also be stored in other columns of the record which may not be tenant identifier columns.

In some situations, the tenant identifier of a record may need to be translated. Tenant identifier translation may replace the value of a tenant identifier in a record with a new value, of a new tenant identifier. For example, when records in a tenant's record set are copied to create a clone of all or a portion of the tenant's record set, for example, for sandboxing, tenant identifier translation may be used to assign a new tenant identifier to the copied records. This may allow records in a sandbox database to be used by the tenant independently of the records in the tenant's record set which was cloned.

To allow for more efficient tenant identifier translation, the records stored in the database system may be modified. A record type indicator may be set in the record header. The record type indicator may be a bit that may be set to 1, or true, to indicate that the record stores the encoded value of the tenant identifier in columns other than the tenant identifier column.

For records identified by the record type indicator in the record header as storing the encoded value of the tenant identifier in columns other than the tenant identifier column, a database application may determine whether to apply tenant identifier translation. The database application may be an application used to interact with the database system. For example, a computing device running the database application may be used by a tenant to access its database in the database system.

To allow for more efficient identification of records for post-cloning tenant identifier translation by the database application, a column may be added to records to expose the value of the record type indicator in the record header which, when set, indicates the presence of the encoded value of the tenant identifier in a column of the record other than the tenant identifier column. The column may be a record type indicator column. A record which has the encoded value of the tenant identifier stored in a column other than the tenant identifier column may have its record type indicator bit set to 1 or true, which may result in its record type indicator column having a value of 1, or true. A record that does not have the encoded value of the tenant identifier stored in a column other than tenant identifier column may have its record type indicator bit set to 0, or false, which may result in its record type indicator column having a value of 0, or false.

The database application, or another suitable component of the database system, the computing device running the database application, or another computing device, may create a partial index based on the values in the record type indicator columns of the records stored in the persistent storage or the working memory of the database system. The partial index may index only those records for which the record type indicator column has a value of 1, or true. The partial index may be used by the database application to access the records indexed by the partial index. The database application may then selectively perform tenant identifier translation on those records. The tenant identifier translation may be performed by an update command, which may replace the encoding of the original value of the tenant identifier stored in columns that store the encoded value of the tenant identifier with an encoding of the new value of the tenant identifier, which may be provided, for example, by the database application. The update command may selectively perform the replacement by walking all of the columns of the records indexed by the partial index and selectively replacing, in any column, any value that matches the encoded value of the tenant identifier with the encoded new value of the tenant identifier. Walking the columns of the records indexed by the partial index may include reading the values stored in every column in those records.

A partial index may be used instead of a full index, as a full index may incur a significant computational cost on every modification of the records, including create, update, and delete operations. A partial index, may allow the computational cost to be reduced for all records that don't include the encoded value of the tenant identifier in columns other than the tenant identifier column, while records that do include the encoded value of the tenant identifier in columns other than the tenant identifier column may incur computational costs similar to those that would have been incurred with a full index. This may result in savings of computational resources, as the number of record that do store the encoded value of the tenant identifier in columns other than the tenant identifier column may be a small portion of all the records in the database or the table.

FIG. 1 shows an example system for identification of records for post-cloning tenant identifier translation according to an implementation of the disclosed subject matter. A database system 100 may include any suitable computing devices, such as, for example, a computer 20 as described in FIG. 13 or component thereof, for identification of records for post-cloning tenant identifier translation. The database system 100 may be implemented on a laptop, a desktop, an individual server, a server cluster, a server farm, or a distributed server system, or can be implemented as a virtual computing device or system, or any suitable combination of physical and virtual systems. The database system 100 can be part of a computing system and network infrastructure or can be otherwise connected to the computing system and network infrastructure, including a larger server network which can include other server systems. The database system 100 may include, for example, any number of server systems which may be in communication with each other and may communicate in any suitable manner. For example, the server systems of the database system 100 may be connected through any suitable network, which may be any suitable combination of LANs and WANs, including any combination of private networks and the Internet. The database system 100 may include a database executor 110 and a storage 140. The storage 140 may include persistent storage 142 and working storage 144. Records 150 and system catalog 160 may be stored in the persistent storage 142.

The database executor 110 may be any suitable combination of hardware and software of the database system 100 for interacting with and managing databases stored on the database system 100. The database system 100 may be, for example, a multi-tenant database system which may store databases for multiple tenants. The records 150 may include records for the databases for the multiple tenants of the database system 100. The database executor 110 may be able to retrieve records from the records 150 for a tenant based on a received query with a scan descriptor and may be able to manipulate records from the records 150. For example, the database executor 110 may be able to copy records from the persistent storage 142 to the working storage 150, update records with new values, merge records from the working storage 150 back to the persistent storage 142 and create new copies of records in the records 150, for example, when cloning a tenant's record set during the creation of a sandbox database.

The persistent storage 142 may be any suitable combination of hardware and software for the persistent storage of data, such as the records 150 and the system catalog 160. For example, the persistent storage 142 may include hard drives, solid state drives, or other forms of persistent data storage. The persistent storage 142 may be distributed across any number of computing devices. The working storage 144 may be any suitable combination of hardware and software for storage of data which may be persistent or non-persistent and may be used to allow for records from the records 150 to be operated with outside of the persistent storage 142. For example, the working storage 144 may include hard drives, solid state drives, random access memory, or other forms of data storage which may be persistent or non-persistent.

The records 150 may include records for the databases of the various tenants of the database system 100. Records in the records 150 may include a tenant identifier to identify the owner of the records. The tenant identifier assigned to a tenant may be used as part of the key for all of the records belonging to the tenant that may be stored in the database. The value of a tenant identifier may be represented as, for example, an alphanumeric string. A unique tenant identifier may be assigned to each of the tenants of the database system 100. Multi-tenancy may allow various tenants, which may be, for example, users, groups of users, or organizations, to access their own records in the database system 100 through software tools or instances on the database system 100 that may be shared among the various tenants. The database for each tenant, including records stored in the records 150, may be, for example, a relational database, hierarchical database, or any other suitable database type. The records 150 may be stored in the persistent storage 142 of the database system 100 in any suitable structure, including, for example, a Log-Structured Merge (LSM) tree. The records may be stored immutable, so that updates to a record after the record is created result in the creation of a new version of the record without making any changes to the stored previous version of the record.

A record from the records 150 stored in the database system 100 may include a key. The key may be an identifier for the record, for example, a primary key, and may be in any suitable form, such as, for example, an alphanumeric sequence. Portions of the key may provide information about the record. For example, a portion of the key be the tenant identifier for the tenant to whom the record belongs. Other portions of the key may identify, for example, a table number and identification of a row, for example, when the value of record is the contents of a row.

A record may include values. The values in a record may be, for example, the contents of columns in a row of a table of a relational database, stored as a tuple with one value per column. The values stored as a tuple may be encoded, for example, using a binary encoding. Some records may store an encoded value of the tenant identifier for the tenant that owns the record in the tuple. The encoded value of the tenant identifier may be stored in, for example, a tenant identifier column of the record. The encoded value of the tenant identifier may also be stored in other columns of the record which may not be tenant identifier columns.

The system catalog 160 may include metadata for tenant's record sets stored in the database system 100. For example, the system catalog 160 may include metadata describing properties of the various column types used in the records of the records 150 for a tenant's record set.

Figure 2A:
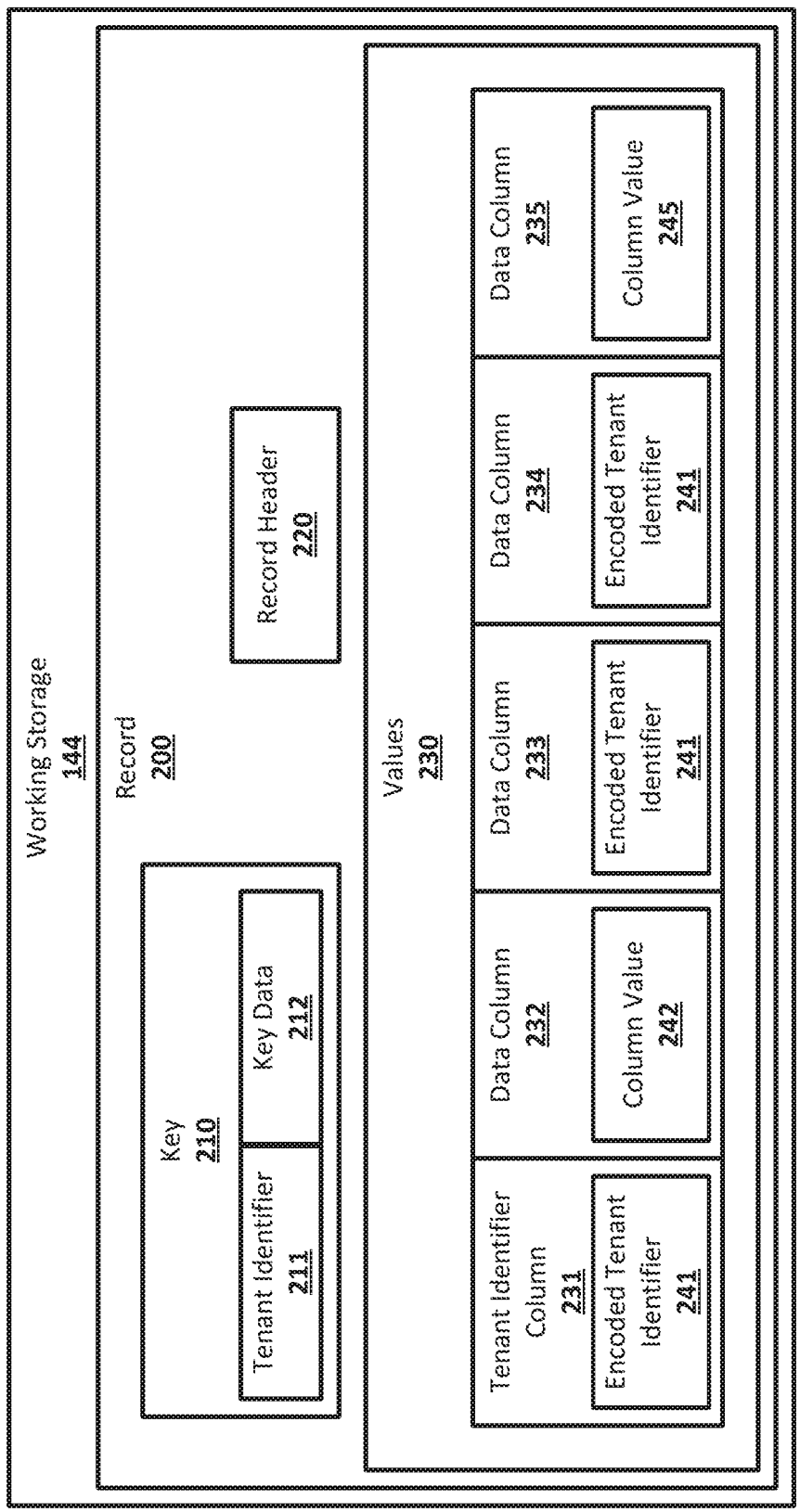
FIG. 2A shows an example arrangement for identification of records for post-cloning tenant identifier translation according to an implementation of the disclosed subject matter.

FIG. 2A shows an example arrangement for identification of records for post-cloning tenant identifier translation according to an implementation of the disclosed subject matter. A record 200 from the records 150 may copied into the working memory 144, for example, by the database executor 110 in response to a query to the database system 100. The database executor 110 may unpack the record 200, for example, expanding the tuple of the record 200 into columns. The record 200 may include a key 210, a record header 220, and values 230. The key 210 may be the key used to identify the record 200 in the tenant's record set and may include a tenant identifier 211 and key data 212. The tenant identifier 211 may be a value of the tenant identifier 211 for the tenant that owns the record 200. The key data 212 may be other data included in the key 210, such as, for example, a table number and identification of a row of the table for the record 200. The key 211 may be stored in the form of an alphanumeric string which may be a concatenation of the tenant identifier 211 and the key data 212.

The record header 220 may be a portion of the record 200 which may store metadata and other additional data for the record 200 that is outside of the values 230. For example, the record header 200 may include indicators, for example, as bits that can be set to 1, or true, or 0, or false, to indicate properties of the record 200.

The values 230 of the record 200 may include the values stored in the columns of the record 200. The values 230 may form a tuple. The columns of the record 200 may be based on the columns of the table of the tenant's record set to which the record 200 belongs, for example, as identified in the key data 212. For example, the columns may be a tenant identifier column 231 and data columns 232, 233, 234, and 235. The tenant identifier column 231 may be a column that stores an encoded tenant identifier 241, which may be an encoding of the value of the tenant identifier 211. The encoding may be, for example, a binary encoding. The data columns 232, 233, 234, and 235, may be columns that store various types of data for the record, such as, for example, character strings of set or varying lengths, or numbers. For example, the data column 232 may store a column value 242, which may be an encoding of a value, such as a character string or number. The data column 235 may store a column value 245, which may be an encoding of a value, such as a character string or number. In some records of the records 150 for a tenant, the encoded value of the tenant identifier may be stored in the columns of the record that are not the tenant identifier column. For example, the record 200 may store the encoded tenant identifier 231 in the data columns 233 and 234 in addition to the tenant identifier column 241.

Figure 2B:
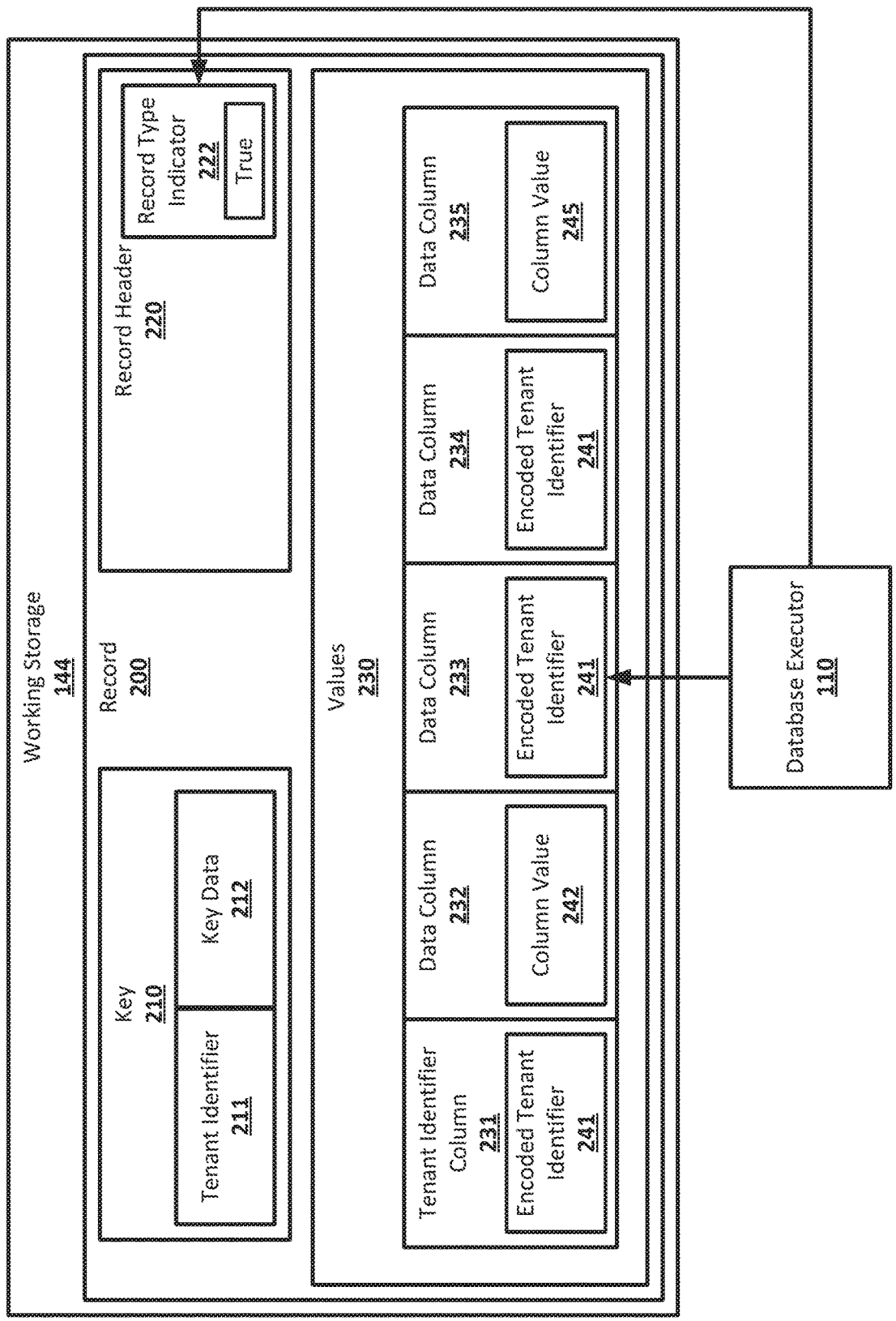
FIG. 2B shows an example arrangement for identification of records for post-cloning tenant identifier translation according to an implementation of the disclosed subject matter.

FIG. 2B shows an example arrangement for identification of records for post-cloning tenant identifier translation according to an implementation of the disclosed subject matter. The data executor 110 may convert a record, such as the record 200, that is in the working storage 144 into a format that may allow for more efficient identification of records for post-cloning tenant identifier translation before the record is packed and stored in the persistent storage 142. The database executor 110 may determine if any of the data columns 232, 233, 234, and 235 store the encoded tenant identifier 241. The record type indicator 222 may be an indicator, such as a bit, that may be used to indicate when the record 200 stores the encoded tenant identifier 241 in a column other than the tenant identifier column 231. If the record 200 does store the encoded tenant identifier 241 in any of the other columns in the values 230, such as any of the data columns 232, 233, 234, and 235, the database executor 110 may set the record type indicator 222 in the record header 220 of the record 200 to 1, or true. Otherwise, the database executor 110 may set the record type indicator 222 to 0, or false.

Figure 3:
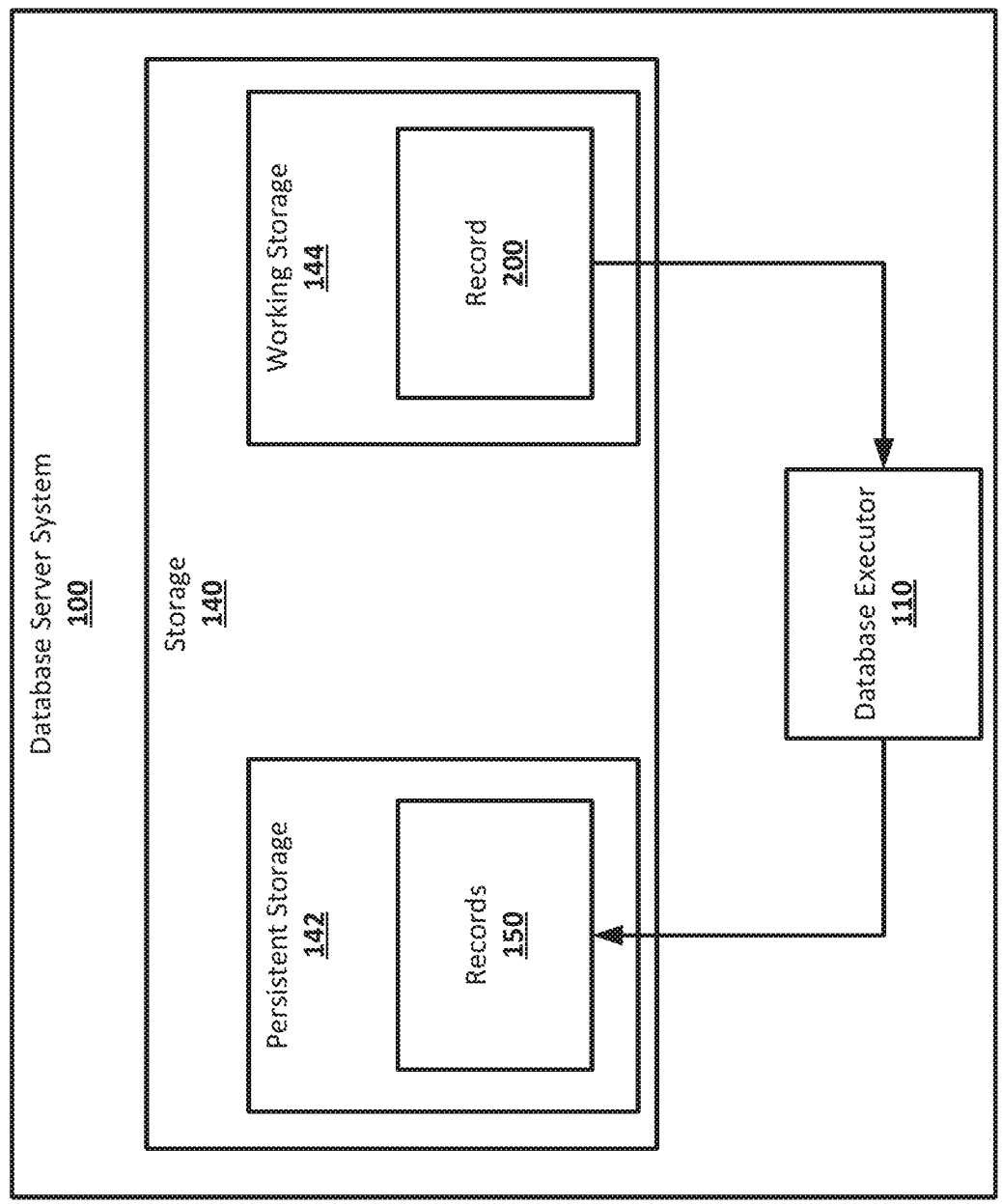
FIG. 3 shows an example arrangement for identification of records for post-cloning tenant identifier translation according to an implementation of the disclosed subject matter.

FIG. 3 shows an example arrangement for identification of records for post-cloning tenant identifier translation according to an implementation of the disclosed subject matter. The database executor 110, after changing the format of the record 200, may pack the record 200 and store it with the records 150 in the persistent storage 142 of the database system 100. The record 200 may be removed from the working storage 144.

Figure 4:
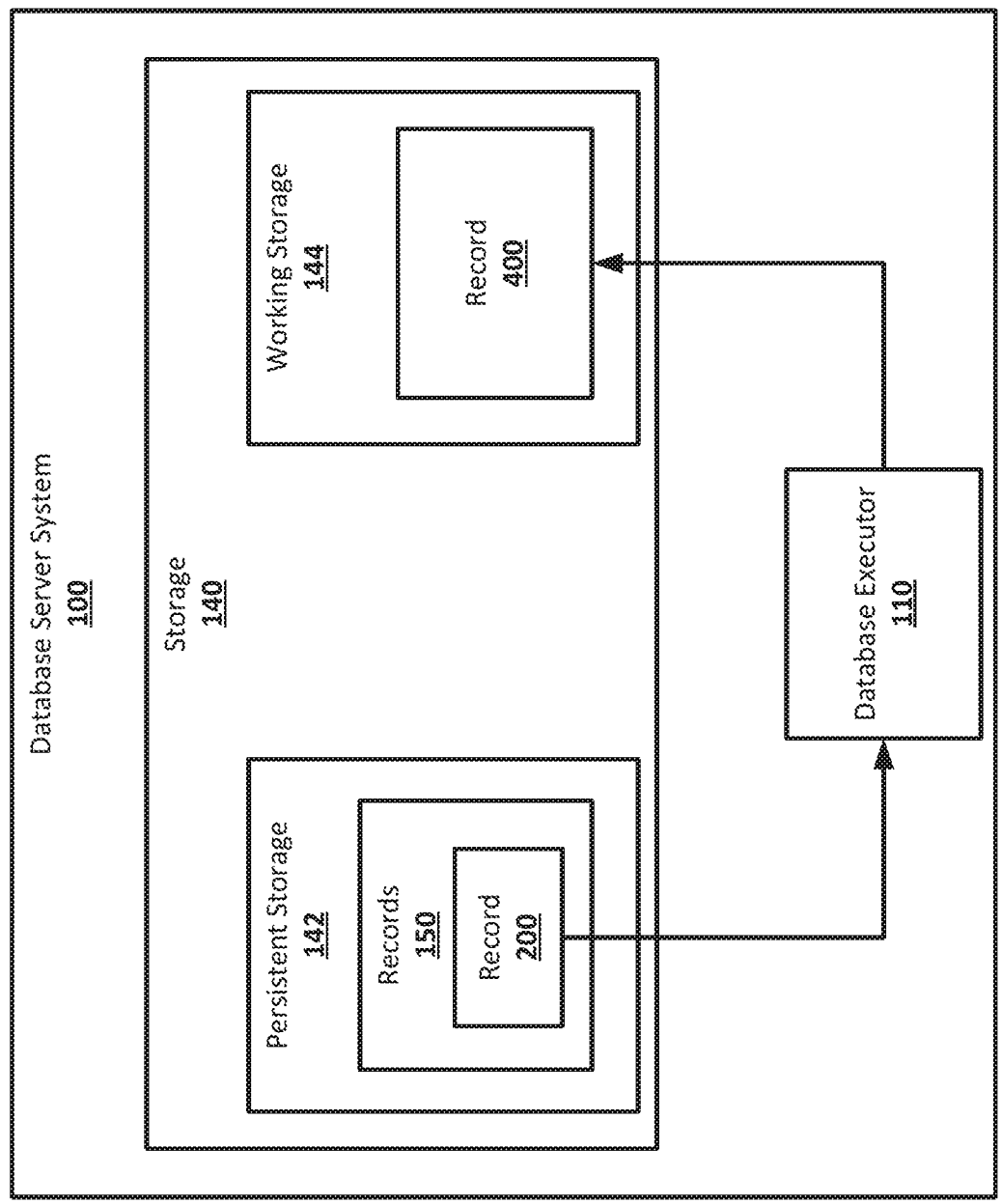
FIG. 4 shows an example arrangement for identification of records for post-cloning tenant identifier translation according to an implementation of the disclosed subject matter.

FIG. 4 shows an example arrangement for identification of records for post-cloning tenant identifier translation according to an implementation of the disclosed subject matter. A tenant's record set in the database system 100 may be cloned, for example, to create a sandbox database. The database executor 110 may copy records of the tenant's record set, from the records 150 in the persistent storage 142, to the working storage 144. For example, the database executor 110 may copy the record 200 into the working storage as the record 400. The packed data in the record 200, for example, the tuple including the values for the values 230, may be expanded when the record 200 is copied into the working storage as the record 400.

Figure 5A:
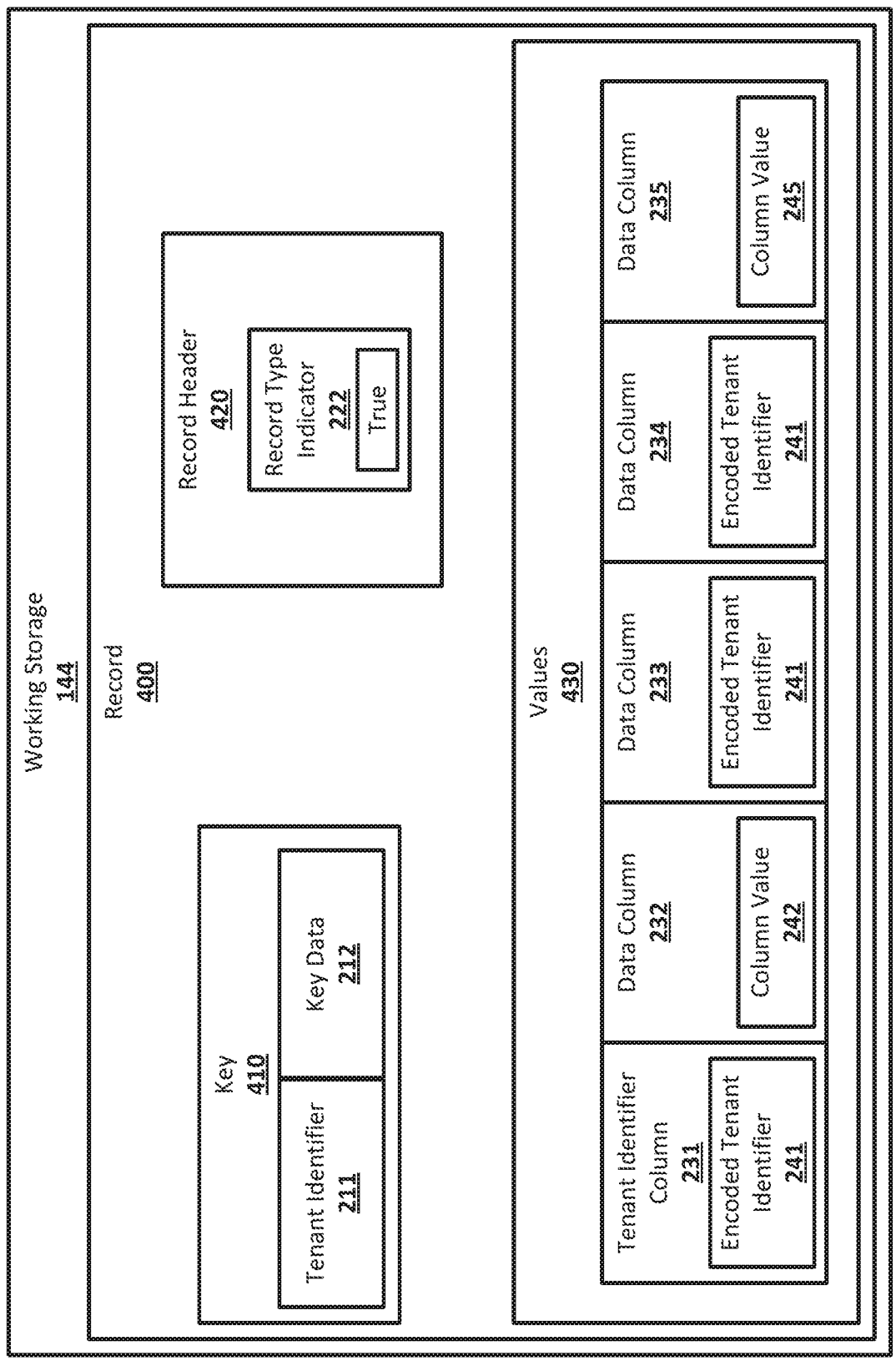
FIG. 5A shows an example arrangement for identification of records for post-cloning tenant identifier translation according to an implementation of the disclosed subject matter.

FIG. 5A shows an example arrangement for identification of records for post-cloning tenant identifier translation according to an implementation of the disclosed subject matter. The record 400 may be a cloned copy of the record 200, and may include the key 410, the record header 420, and the values 430. The key 410 may be a copy of the key 210, including the tenant identifier 211 and the key data 212. The record header 420 may be a copy of the record header 220, including the record type indicator 222. The values 430 may be a copy of the values 230, including the tenant identifier column 231 storing the encoded tenant identifier 241, the data column 232 storing the column value 242, the data column 233 storing the encoded tenant identifier 241, the data column 234 storing the encoded tenant identifier 241, and the data column 235 storing the column value 245.

Figure 5B:
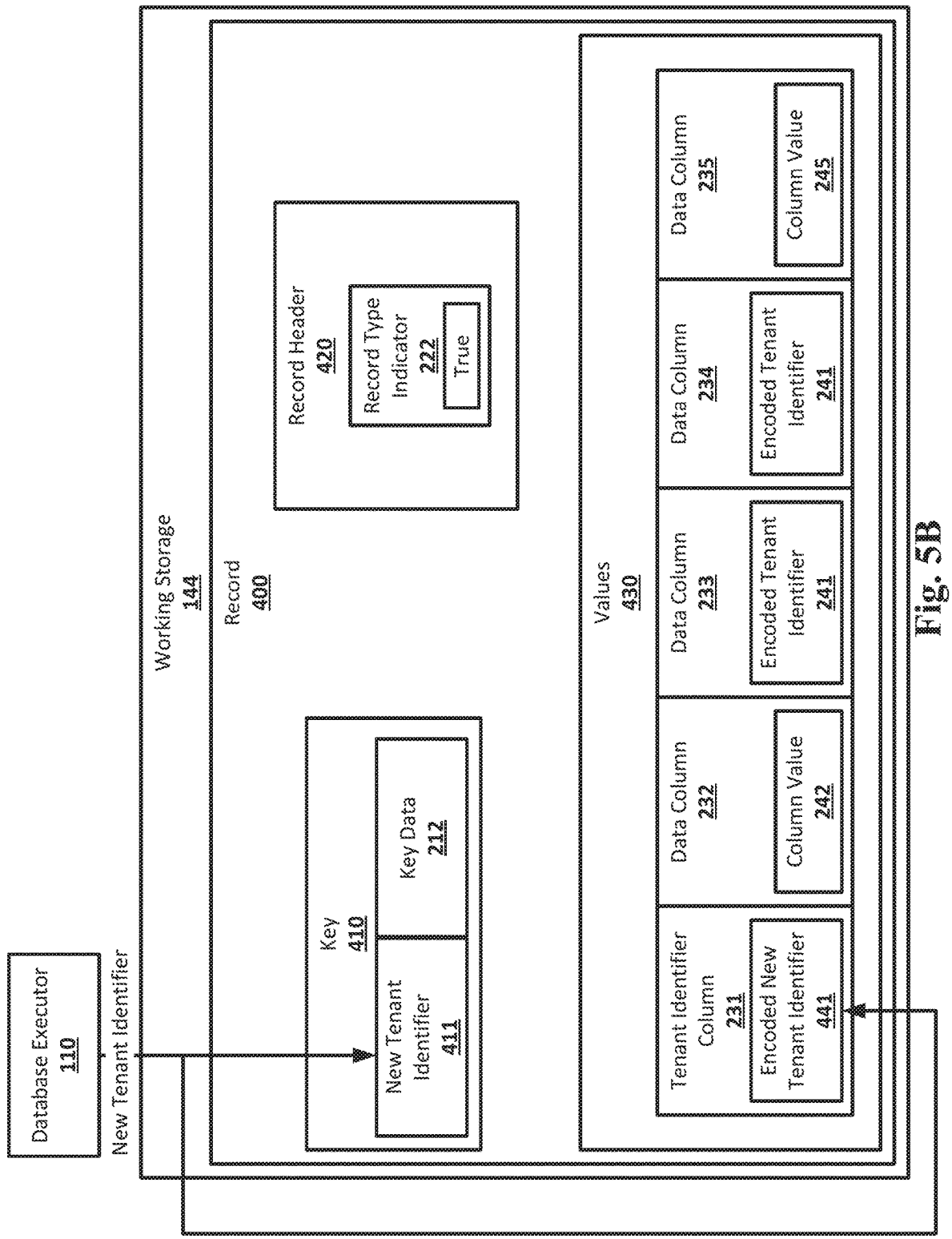
FIG. 5B shows an example arrangement suitable for identification of records for post-cloning tenant identifier translation according to an implementation of the disclosed subject matter.

FIG. 5B shows an example arrangement for identification of records for post-cloning tenant identifier translation according to an implementation of the disclosed subject matter. The database executor 110 may perform translation of the tenant identifier of the record 400 in order to prepare the record 400 for use in a sandbox database that is cloned from records from the tenant's record set that includes the record 200. Tenant identifier translation may be needed to prevent conflict between the records in the sandbox database and the records in the tenant's record set that was cloned to create the sandbox database.

The database executor 110 may determine the value of the tenant identifier for the tenant that owns the record 200, of which the record 400 is a copy, from the key 410, or from a scan descriptor in a query received by the database system 100 and to which the record 200 was responsive, for example, the scan descriptor used to locate records to clone to create a sandbox database. The database executor 110 may then use a new value for a tenant identifier, for example, new tenant identifier 411, to replace the value of the tenant identifier, for example, the tenant identifier 211, in the key 410. The new tenant identifier 411 may be a value for a tenant identifier that is different from the value for the tenant identifier 211, indicating that a new tenant owns the record 400. The new tenant represented by the new tenant identifier 411 may be the same entity, for example, same users, groups of users, or organization, as the tenant represented by the tenant identifier 211, or may be a different entity. For example, an entire organization may be represented by the tenant identifier 211, while only a subset of that organization may be represented by the tenant identifier 411. This may allow for control over the entities, including people and organizations, that have access to a sandbox database that is a clone of an existing tenant's record set, separating access to the sandbox database and tenant's record set. The database executor 110 may also replace the encoded tenant identifier 241 in the tenant identifier column 231 with the encoded new tenant identifier 441.

Figure 6:
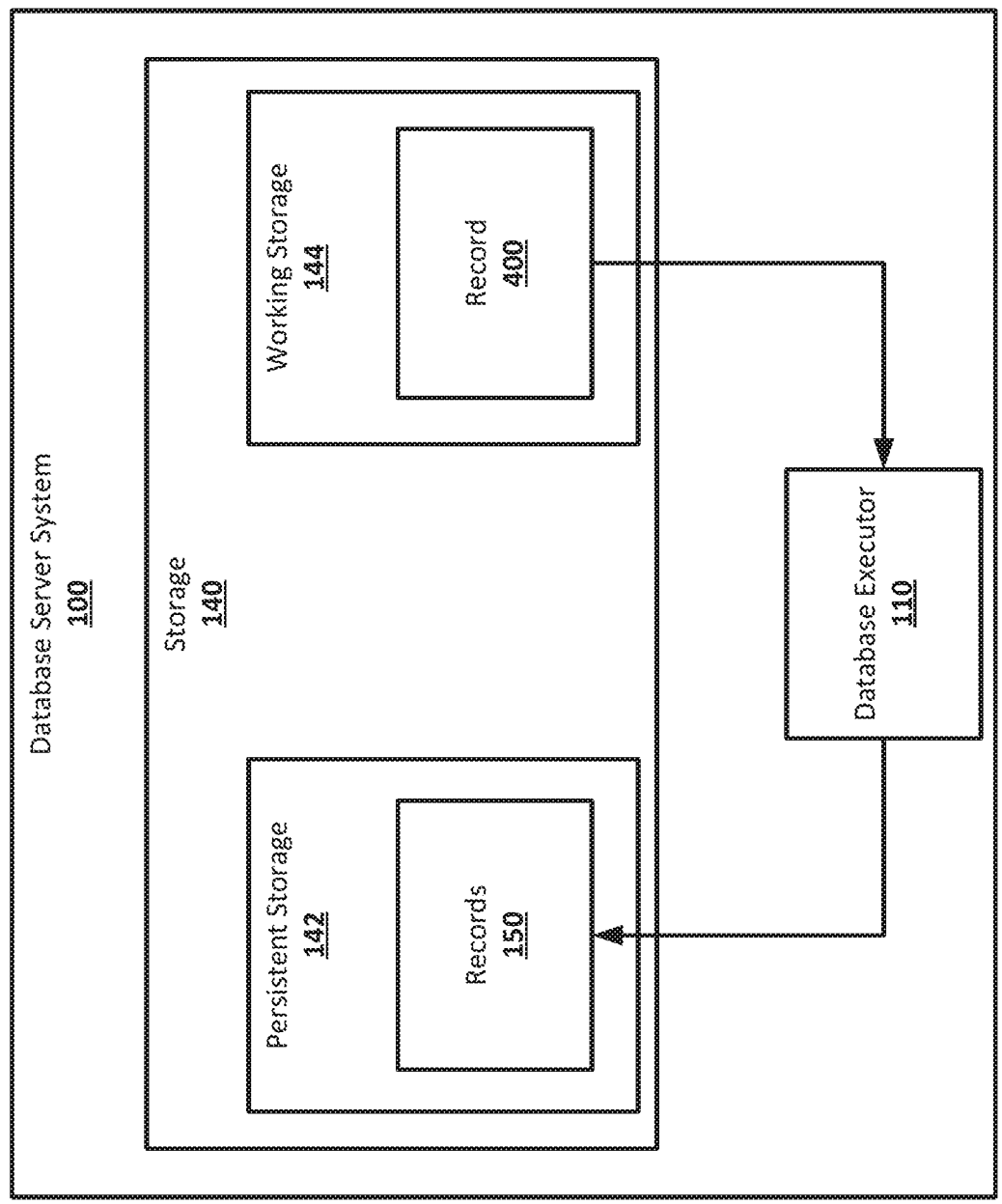
FIG. 6 shows an example arrangement suitable for identification of records for post-cloning tenant identifier translation according to an implementation of the disclosed subject matter.

FIG. 6 shows an example arrangement for identification of records for post-cloning tenant identifier translation according to an implementation of the disclosed subject matter. The database executor 110, after completing the cloning of the record 400, may pack the record 400 and store it with the records 150 in the persistent storage 142 of the database system 100. The record 400 may be removed from the working storage 144.

Figure 7:
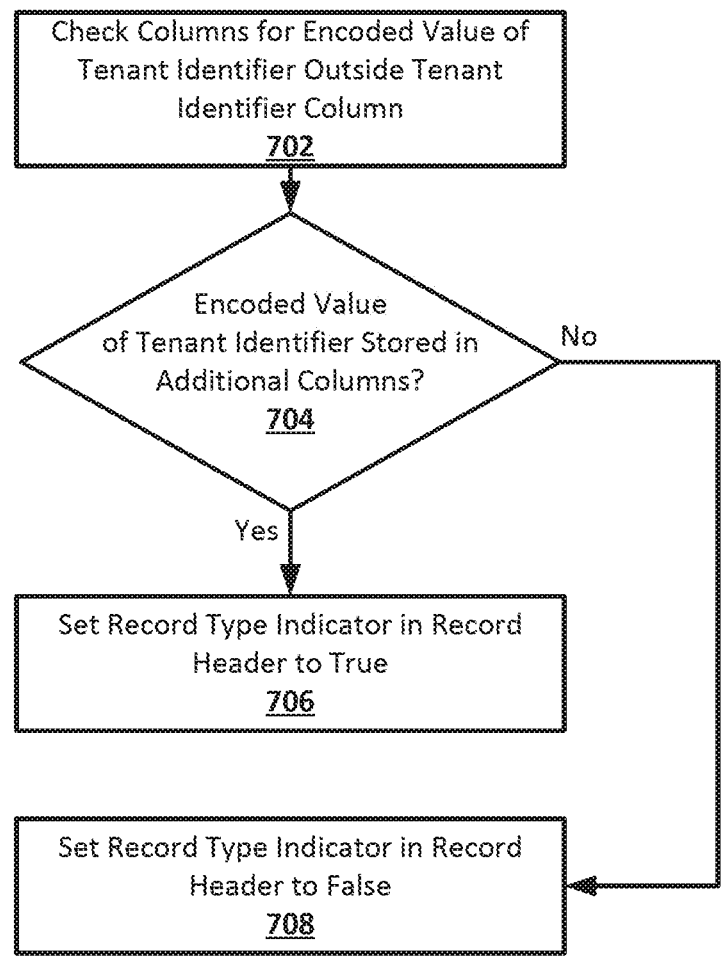
FIG. 7 shows an example procedure suitable for identification of records for post-cloning tenant identifier translation according to an implementation of the disclosed subject matter.

FIG. 7 shows an example procedure suitable for identification of records for post-cloning tenant identifier translation according to an implementation of the disclosed subject matter. At 702, columns of a record may be checked for an encoded value of a tenant identifier outside of the tenant identifier column. For example, the database executor 110 may check the data columns 232, 233, 234, and 235 of the record 200 for the encoded tenant identifier 241.

At 704, if the encoded value of the tenant identifier is stored in any additional columns of the record outside of the tenant identifier column, flow may proceed to 706. Otherwise, flow may proceed to 708 where the record type indicator for the record may be set to false.

At 706, a record type indicator in the record header may be set to true. For example, the database executor 110 may set the record type indicator 222 in the record header 220 to 1, or true, to indicate that the encoded tenant identifier 241 was found to be stored in a column of the record 200 outside of the tenant identifier column 231.

At 708, a record type indicator in the record header may set to false. For example, the database executor 110 may set the record type indicator 222 to 0, or false, to indicate that the record 200 does not store the encoded tenant identifier 241 in any columns outside of the tenant identifier column 231.

Figure 8:
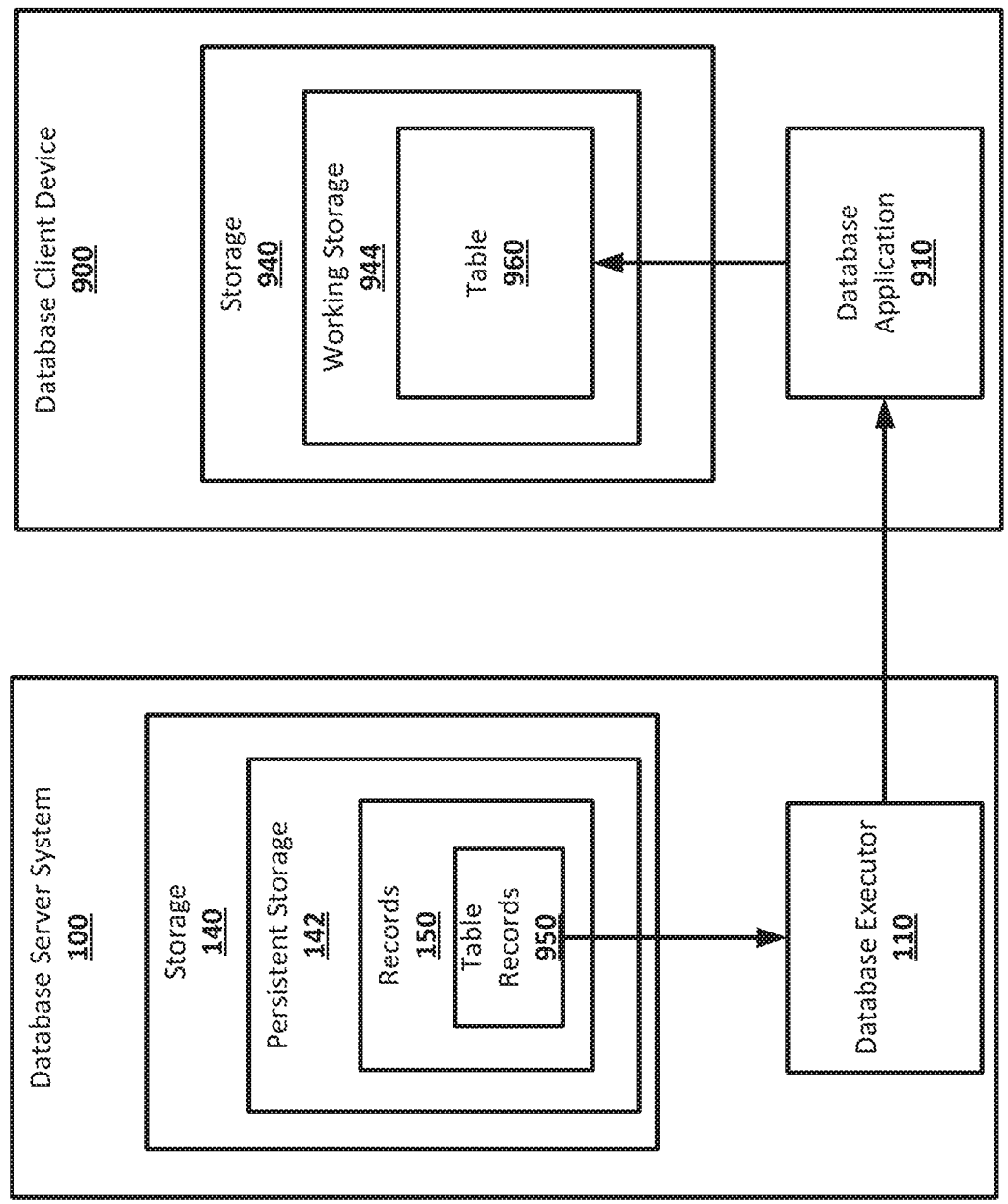
FIG. 8 shows an example arrangement suitable for identification of records for post-cloning tenant identifier translation according to an implementation of the disclosed subject matter.

FIG. 8 shows an example arrangement for identification of records for post-cloning tenant identifier translation according to an implementation of the disclosed subject matter. A tenant's record set in the database system 100 may be cloned, for example, to create a sandbox database. A database application 910, running on a database client device 900, may access table records 950, which may be the records for a table of a sandbox database. The database client device 900 may be any suitable computing device for interacting with the database system 100. The database application 910 may be any suitable application running on the database client device 900 that may allow for interaction with the database system 100 and the database executor 110. For example, the database application 910 may be an application used by entities that own tenant record sets stored in the persistent storage 142 of the database system 100.

The database executor 110 may copy the table records 950 and transmit them to the database application 910 over any suitable communications link. The database application 910 may expand the tables records 950 into a table 960 in working storage 944 of the database client device 900.

FIG. 9 shows an example arrangement for identification of records for post-cloning tenant identifier translation according to an implementation of the disclosed subject matter. The table 960 may include rows for each of the records in the table 960. The table 960 may include the records 400, 1010, 1020, 1030, and 1040. The columns of the table 960 may be key column 1001, the tenant identifier column 231, the data columns 232, 233, 234, and 235, and a record type indicator column 1005. The record type indicator column 1005 may expose the value of the record type indicator in each of the records 400, 1010, 1020, 1030, and 1040. The record 400 may include the key 410 in the key column 1001, the encoded tenant identifier 241 in the tenant identifier column 231, the column value 242 in the data column 232, the encoded tenant identifier 241 in the data column 233, the encoded tenant identifier 241 in the data column 234, the column value 245 in the data column 235, and the value 1, or true, in the record type indicator column 1005.

The record 1010 may include the key 1011 in the key column 1001, the encoded new tenant identifier 441 in the tenant identifier column 231, the column value 1012 in the data column 232, the column value 1013 in the data column 233, the column value 1014 in the data column 234, the column value 1015 in the data column 235, and the value 0, or false, in the record type indicator column 1005.

The record 1020 may include the key 1021 in the key column 1001 the encoded new tenant identifier 441 in the tenant identifier column 231, the column value 1022 in the data column 232, the column value 1013 in the data column 233, the column value 1024 in the data column 234, the column value 1025 in the data column 235, and the value 0, or false, in the record type indicator column 1005.

The record 1030 may include the key 1031 in the key column 1001, the encoded new tenant identifier 441 in the tenant identifier column 231, the encoded tenant identifier 241 in the data column 232, the column value 1032 in the data column 233, the encoded tenant identifier 241 in the data column 234, the column value 1035 in the data column 235, and the value 1, or true, in the record type indicator column 1005.

The record 1040 may include the key 1041 in the key column 1001, the encoded new tenant identifier 441 in the tenant identifier column 231, the column value 1042 in the data column 232, the encoded tenant identifier 241 in the data column 233, the column value 1045 in the data column 234, the encoded tenant identifier 241 in the data column 235, and the value 1, or true, in the record type indicator column 1005.

FIG. 10 shows an example arrangement for identification of records for post-cloning tenant identifier translation according to an implementation of the disclosed subject matter. The database application 910 may identify the rows of the table 960 that include a 1, or value of true, in the record type indicator column 1005. The database application 910 may create a partial index 1160 from the identified rows.

The partial index 1160 may include the key column 231 and the record type indicator column 1005. Each row in the partial index 1160 may correspond to a row of the table 960 that had a value of 1, or true, in the record type indicator column 1005. The keys in the key column 231 of the partial index 1160 may identify a record that has its record type indicator set to 1, or true, in its record header, and may be used to access the records in the 960.

Figure 11A:
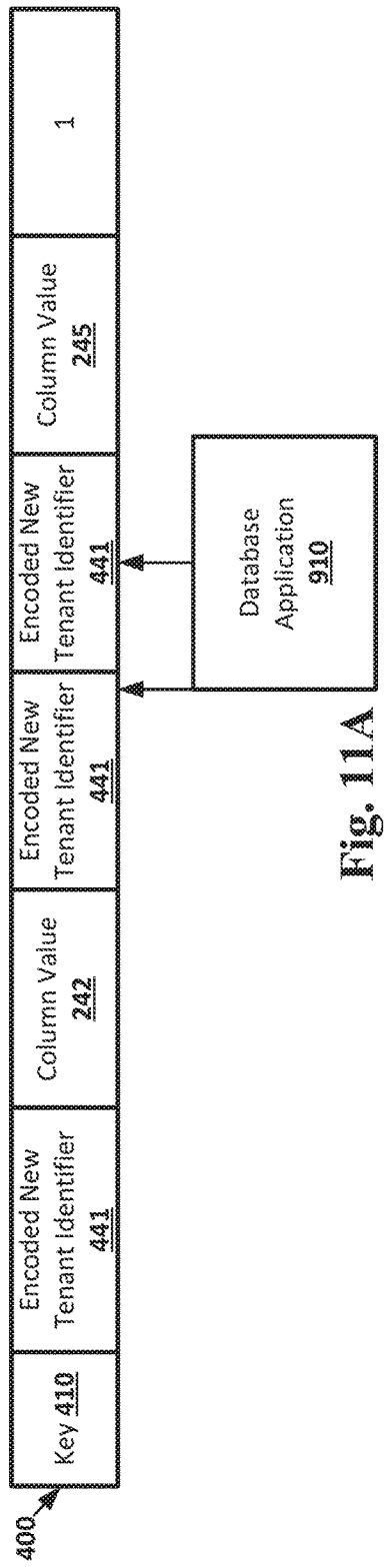
FIG. 11A shows an example arrangement suitable for identification of records for post-cloning tenant identifier translation according to an implementation of the disclosed subject matter.

FIG. 11A shows an example arrangement for identification of records for post-cloning tenant identifier translation according to an implementation of the disclosed subject matter. The database application 910 may use the key 410 from the partial index 1160 to access the row that stores values from the record 400 in the table 960. The database application 910 may determine that the record 400 includes the encoded tenant identifier 241 in the data columns 233 and 234. The database application 910 may then determine whether to perform tenant identifier translation on the data columns 233 and 234 of the record 400. If the database application 910 performs tenant identifier translation, the encoded tenant identifier 241 may be removed and replaced with the encoded new tenant identifier 441.

Figure 11B:
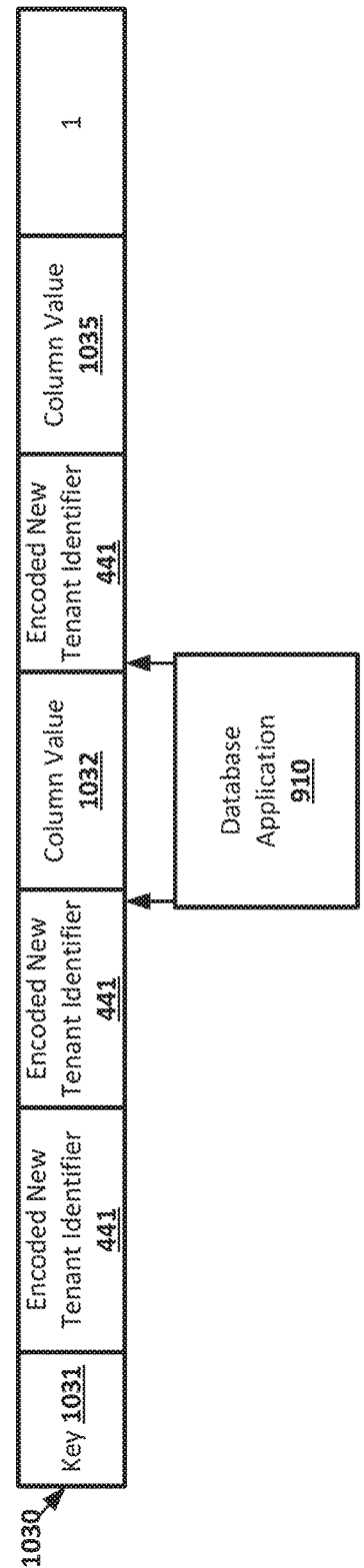
FIG. 11B shows an example arrangement suitable for identification of records for post-cloning tenant identifier translation according to an implementation of the disclosed subject matter.

FIG. 11B shows an example arrangement for identification of records for post-cloning tenant identifier translation according to an implementation of the disclosed subject matter. The database application 910 may use the key 1031 from the partial index 1160 to access the row that stores values from the record 1030 in the table 960. The database application 910 may determine that record 1030 includes the encoded tenant identifier 241 in the data columns 232 and 234. The database application 910 may then determine whether to perform tenant identifier translation on the data columns 232 and 234 of the record 1030. If the database application 910 performs tenant identifier translation, the encoded tenant identifier 241 may be removed and replaced with the encoded new tenant identifier 441.

Figure 11C:
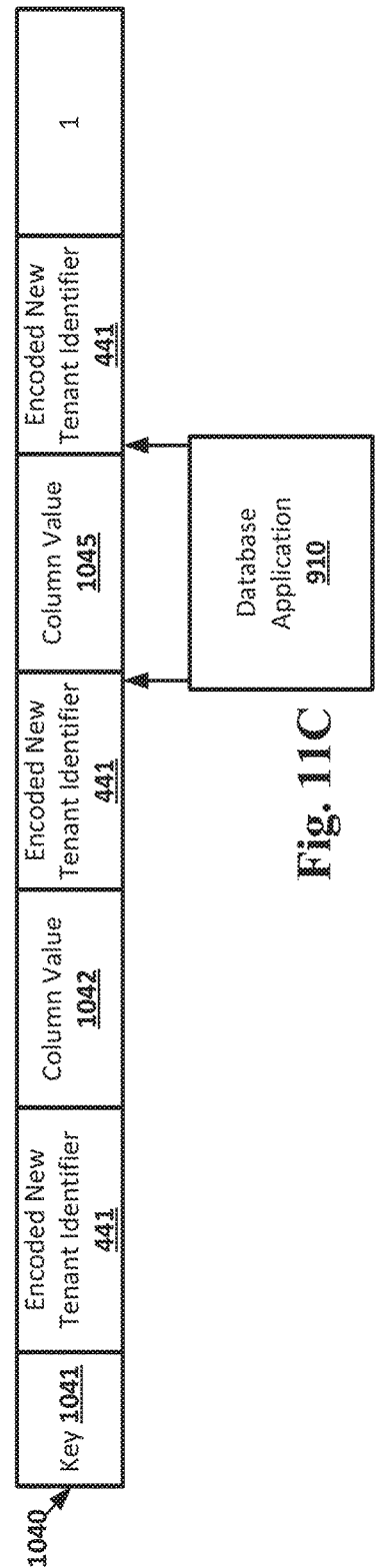
FIG. 11C shows an example arrangement suitable for identification of records for post-cloning tenant identifier translation according to an implementation of the disclosed subject matter.

FIG. 11C shows an example arrangement for identification of records for post-cloning tenant identifier translation according to an implementation of the disclosed subject matter. The database application 910 may use the key 1041 from the partial index 1160 to access the row that stores values from the record 1040 in the table 960. The database application 910 may determine that record 1040 includes the encoded tenant identifier 241 in the data columns 233 and 235. The database application 910 may then determine whether to perform tenant identifier translation on the data columns 233 and 235 of the record 1040. If the database application 910 performs tenant identifier translation, the encoded tenant identifier 241 may be removed and replaced with the encoded new tenant identifier 441.

Figure 12:
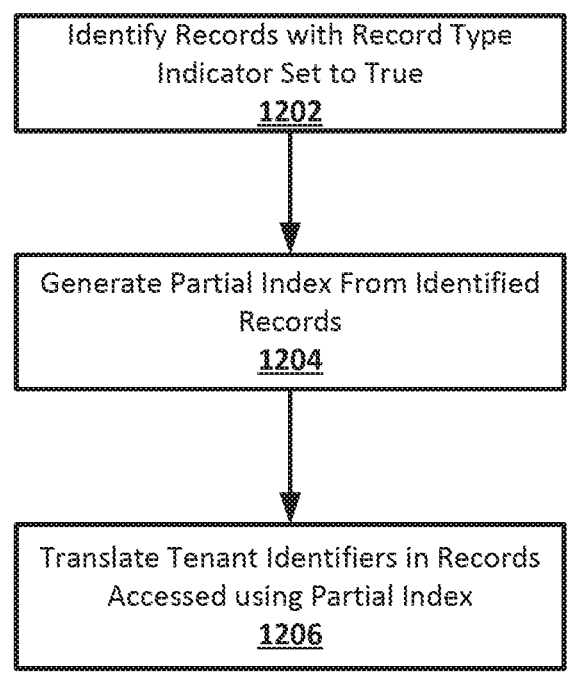
FIG. 12 shows an example procedure suitable for identification of records for post-cloning tenant identifier translation according to an implementation of the disclosed subject matter.

FIG. 12 shows an example procedure suitable for identification of records for post-cloning tenant identifier translation according to an implementation of the disclosed subject matter. At 1202, records with the record type indicator set to true may be identified. For example, the database application 910 may examine the records represented in the rows of the table 960 to identify the rows, and corresponding records, that have a value of 1, or true, in the record type indicator column 1005. The table 960 may include records that may be part of a sandbox database received from the persistent storage 142 of the database system 100.

At 1204, a partial index may be generated from the identified records. For example, the database application 910 may generate the partial index 1160 from the records corresponding to the rows of the table 960 that have a value of 1, or true, in the record type indicator column 1005. The partial index 1160 may include the keys of the identified records, for example, the keys 410, 1031, and 1041 of the records 400, 1030, and 1040.

At 1206, the tenant identifiers in records accessed using the partial index may be translated. For example, the database application 910 may use the keys 410, 1031, and 1041 from the partial index 1160 to access the records 400, 1030, and 1040 in the table 960. The database application 910 may scan the values of the records 400, 1030, and 1040 for occurrences of the encoded tenant identifier 241, and may determine whether to perform tenant identifier translation for each occurrence of the encoded tenant identifier 241. The database application 910 may perform tenant identifier translation by replacing a found occurrence of the tenant identifier 241 with the encoded new tenant identifier 441. This may complete the tenant identifier translation for the records in the table 960, which may then be made available for use as part of a sandbox database owned by the tenant associated with the new tenant identifier 411.

Figure 13:
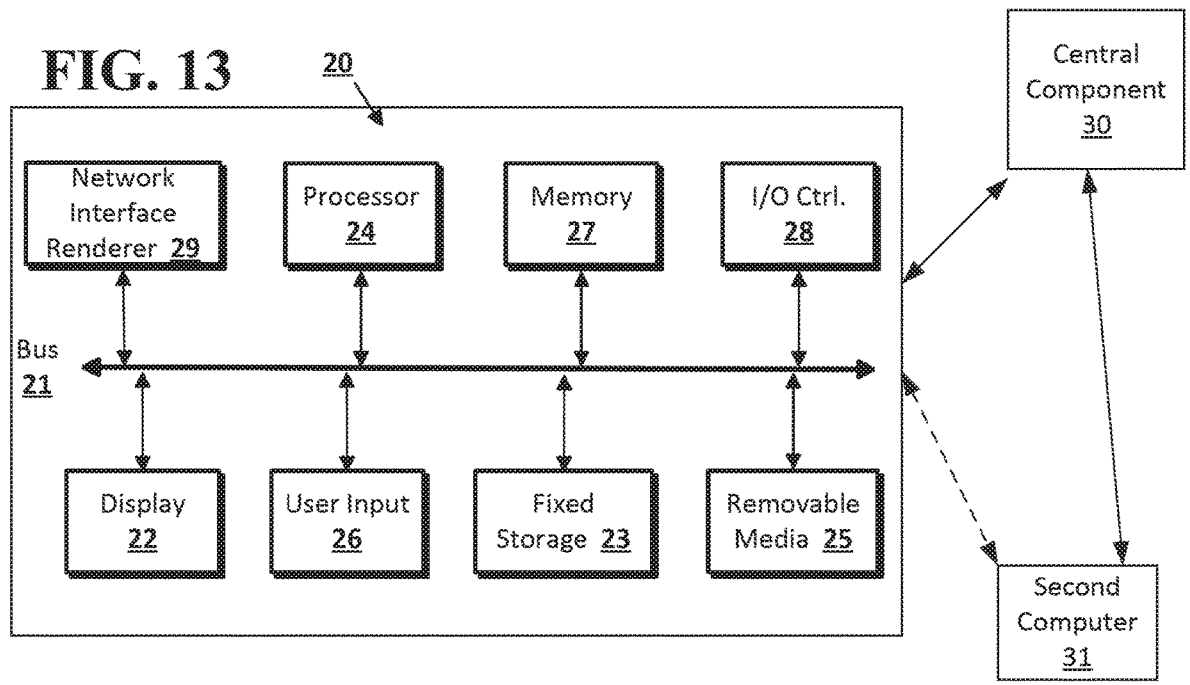
FIG. 13 shows a computer according to an implementation of the disclosed subject matter.

Implementations of the presently disclosed subject matter may be implemented in and used with a variety of component and network architectures. FIG. 13 is an example computer 20 suitable for implementing implementations of the presently disclosed subject matter. As discussed in further detail herein, the computer 20 may be a single computer in a network of multiple computers. As shown in FIG. 13, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 14.

Many other devices or components (not shown) may be connected in a similar manner (e.g., document scanners, digital cameras and so on). Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, removable media 25, or on a remote storage location.

Figure 14:
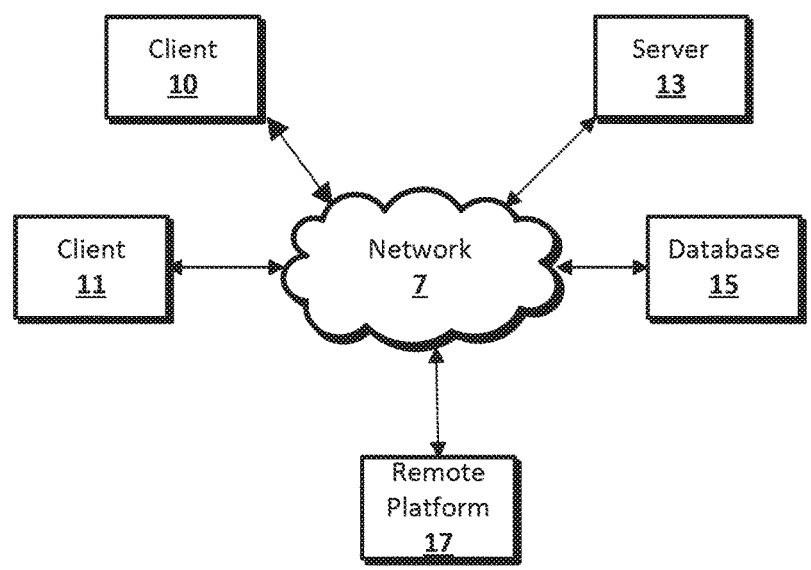
FIG. 14 shows a network configuration according to an implementation of the disclosed subject matter.

FIG. 14 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving, from a database system executing a database executor, at a computing device executing a database application, records;
   identifying, by the database application, from among the records, one or more records that comprise a record header comprising a bit indicating that an encoded value of a tenant identifier is stored in the record in a column of the record that is not a tenant identifier column;
   generating, by the database application, a partial index based on the one or more records identified by the database application; and
   accessing, by the database application using the partial index, the one or more records and replacing by the database application the encoded value of the tenant identifier stored in columns of the one or more records with an encoded new value of a new tenant identifier wherein the new tenant identifier is different from and does not include the tenant identifier.

2. The computer implemented method of claim 1, wherein accessing the one or more records using the partial index and replacing the encoded value of the tenant identifier stored in columns of the one or more records with an encoded new value of a new tenant identifier further comprises walking the columns of the one or more records.

3. The computer-implemented method of claim 1, wherein the database system is a multi-tenanted database system.

4. The computer-implemented method of claim 1, wherein the one or more records are received from persistent storage of the database system.

5. The computer-implemented method of claim 1, wherein the one or more records are unpacked in working memory of the computing device.

6. The computer-implemented method of claim 1, wherein the one or more records are part of a sandbox database cloned from a database owned by a tenant identified by the value of the tenant identifier, and wherein the sandbox database is owned by a tenant identified by the new value of the new tenant identifier.

7. The computer-implemented method of claim 1, further comprising, after accessing the one or more records using the partial index and replacing the encoded value of the tenant identifier stored in columns of the one or more records with an encoded new value of a tenant identifier, making the one or more records available for use as part of a database for the tenant identified by the new value of the new tenant identifier.

8. A computer-implemented system for identification of records for post-cloning tenant identifier translation comprising:
   one or more storage devices comprising a working storage; and
   a processor of a computing device that, receives, from a database system executing a database executor, records, identifies, from among the records, one or more records that comprise a record header comprising a bit indicating that an encoded value of a tenant identifier is stored in the record in a column of the record that is not a tenant identifier column, generates a partial index based on the one or more identified records, and accesses the one or more records using the partial index and replaces the encoded value of the tenant identifier stored in columns of the one or more records with an encoded new value of a new tenant identifier, wherein the new tenant identifier is different from and does not include the tenant identifier.

9. The computer-implemented system of claim 8, wherein the processor further accesses the one or more records using the partial index and replaces the encoded value of the tenant identifier stored in columns of the one or more records with an encoded new value of a new tenant identifier by walking the columns of the one or more records.

10. The computer-implemented system of claim 8 wherein the database system is a multi-tenanted database system.

11. The computer-implemented system of claim 8, wherein the one or more records that the processor receives are received from persistent storage of the database system.

12. The computer-implemented system of claim 8, wherein the one or more records are unpacked in the working memory.

13. The computer-implemented system of claim 8, wherein the one or more records are part of a sandbox database cloned from a database owned by a tenant identified by the value of the tenant identifier, and wherein the sandbox database is owned by a tenant identified by the new value of the new tenant identifier.

14. The computer-implemented system of claim 8, further comprising, after accessing the one or more records using the partial index and replacing the encoded value of the tenant identifier stored in columns of the one or more records with an encoded new value of a tenant identifier, making the one or more records available for use as part of a database for the tenant identified by the new value of the new tenant identifier.

15. A system comprising: one or more computers and one or more storage devices storing instructions which are operable, when executed by the one or more computers, to cause the one or more computers to perform operations comprising:
    receiving, from a database system executing a database executor, at a computing device executing a database application, records;
    identifying, by the database application, from among the records, one or more records that comprise a record header comprising a bit indicating that an encoded value of a tenant identifier is stored in the record in a column of the record that is not a tenant identifier column;
    generating, by the database application, a partial index based on the one or more records identified by the database application; and
    accessing, by the database application using the partial index, the one or more records and replacing by the database application the encoded value of the tenant identifier stored in columns of the one or more records with an encoded new value of a new tenant identifier, wherein the new tenant identifier is different from and does not include the tenant identifier.

16. The system of claim 15, wherein the instructions that, when executed by the one or more computers, cause the one or more computers to perform operations comprising accessing the one or more records using the partial index and replacing the encoded value of the tenant identifier stored in columns of the one or more records with an encoded new value of a new tenant identifier further cause the one or more computers to perform operations comprising walking the columns of the one or more records.

17. The system of claim 15, wherein the database system is a multi-tenanted database system.

18. The system of claim 15, wherein the one or more records are received from persistent storage of the database system.

19. The system of claim 15, wherein the one or more records are unpacked in working memory of the computing device.

20. The system of claim 15, wherein the one or more records are part of a sandbox database cloned from a database owned by a tenant identified by the value of the tenant identifier, and wherein the sandbox database is owned by a tenant identified by the new value of the new tenant identifier.

21. The system of claim 15, wherein the instructions, when executed by the one or more computers, further cause the one or more computers to perform operations comprising, after accessing the one or more records using the partial index and replacing the encoded value of the tenant identifier stored in columns of the one or more records with an encoded new value of a tenant identifier, making the one or more records available for use as part of a database for the tenant identified by the new value of the new tenant identifier.

* * * * *